May 7, 1968
T. G. OXLEY ETAL
3,382,112
INGOT CARRIAGE
Filed May 6, 1964
2 Sheets-Sheet 1
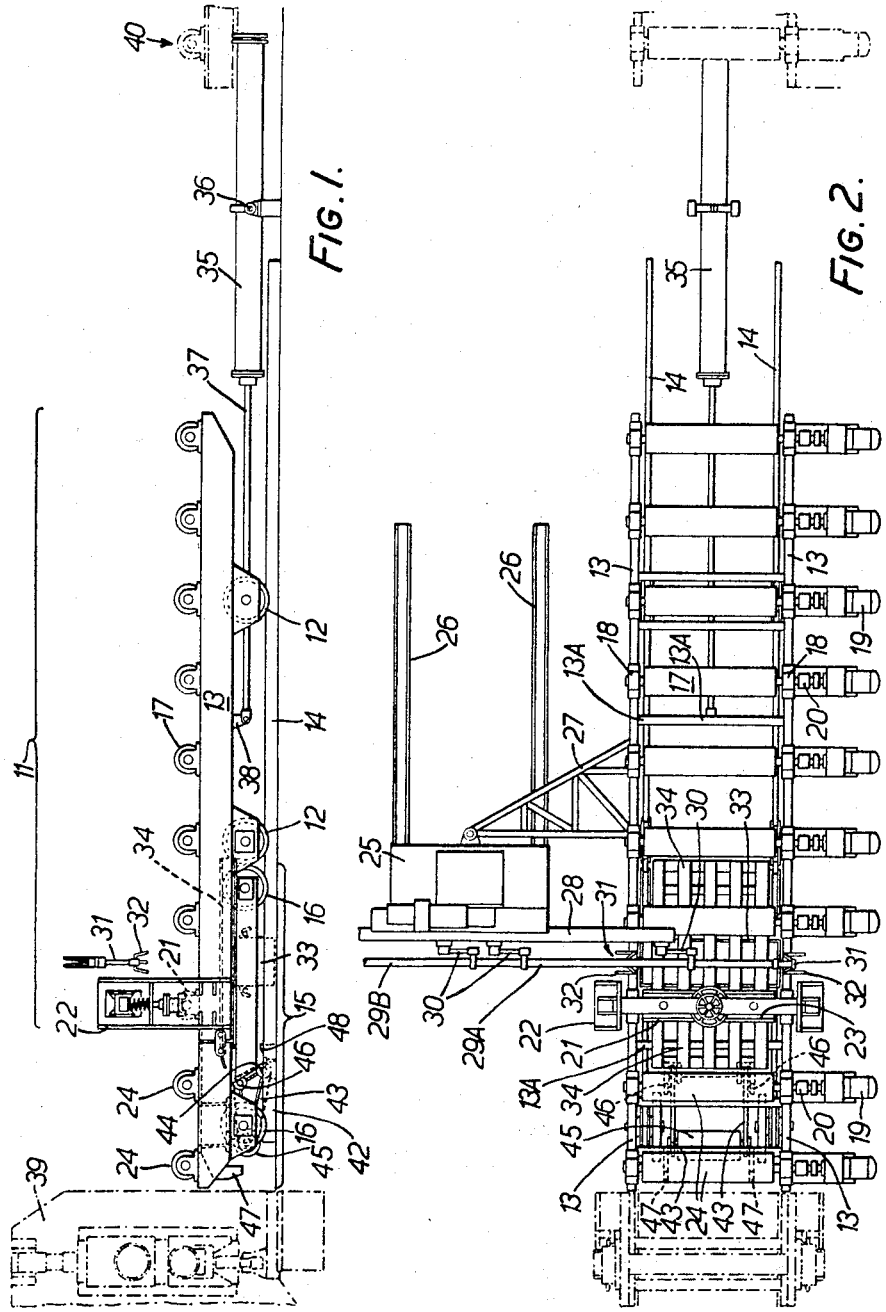
INVENTORS
T. G. Oxley
D. A. Smithson
Holcomb, Wetherill & Brisbois
ATTORNEYS May 7, 1968    T. G. OXLEY ETAL    3,382,112
INGOT CARRIAGE Filed May 6, 1964    2 Sheets-Sheet 2

INVENTORS
T. G. Oxley
D. A. Smithson
BY
Holcomb, Wetherill & Brisebois
ATTORNEYS

United States Patent Office 3,382,112
Patented May 7, 1968

3,382,112
INGOT CARRIAGE
Thomas Graeme Oxley, Sheffield, and Derek Alan Smithson, Staveley, near Chesterfield, England, assignors to Davy and United Engineering Company Limited, Sheffield, England
Filed May 6, 1964, Ser. No. 365,314
Claims priority, application Great Britain, May 10, 1963, 18,533/63
12 Claims. (Cl. 148—9)

ABSTRACT OF THE DISCLOSURE

This invention relates to an apparatus and method for cutting horizontal movable material by supporting the material on a movable carriage and moving the material, the cutting means and the carriage at the same velocity, and additionally having the cutting means transversely to the movement of the material to be cut, and after the cut reversing the carriage; according to the invention the carriage is provided with means for supporting the material to be cut at intervals along its length and means for driving the cut-off portion over the carriage after the cut.

---

Figure 3:
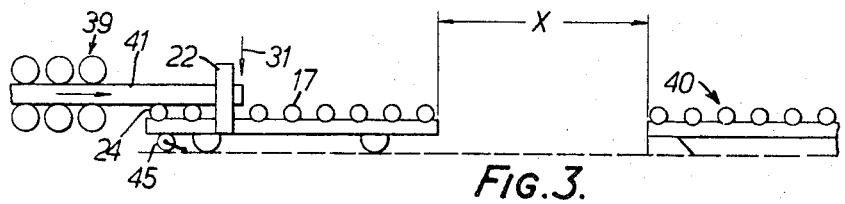
Figure 4:
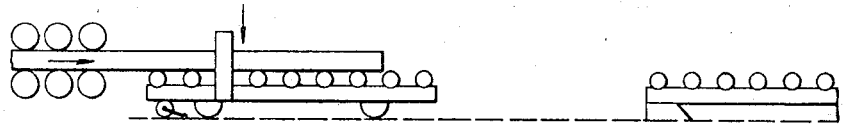

This invention relates to a method and apparatus for cutting horizontally moving material, such as a continuous ingot issuing from a continuous casting plant.

In such cutting operation, arrangements must be made to protect the means supporting the ingot from damage by the cutter.

In one previous arrangement for cutting a moving ingot, rollers supporting the ingot are automatically moved downwardly away from the ingot as the cutter passes over them, and are returned to support the ingot after the cutter has passed.

In a further previous arrangement a series of recirculating rollers are arranged in the form of an endless chain, the cutter being located between two of the rollers, and the chain travelling at the same speed as the cutter.

In a third previous arrangement, a roller table is provided with rollers arranged so as to leave a space aligned beneath the path or paths of the cutter or cutters.

The former two previous arrangements are expensive to manufacture and maintain, whilst the latter limits the speed of casting to a proportion of the speed at which the cut is being made, because the inclination of the path formed by the speed, to the line of travel of the material, is fixed.

Since, in practice, the speeds of both the casting and cutting operations each vary independently, it is clearly desirable to provide the minimum of maintenance, and which can accommodate a range of cutting and casting speeds.

The present invention provides a method of cutting horizontally moving material which comprises supporting the part of the material adjacent the portion to be cut on a moveable carriage, moving the carriage and cutting means with the same velocity as the moving material during a cutting operation, and additionally moving the cutting means transversely to the direction of movement of the material to effect a cut, and after the cut reversing the carriage through at least the distance travelled during the cutting operation.

In another aspect the invention provides apparatus for cutting horizontally moving material, comprising a carriage arranged for supporting the material, means for moving the carriage in opposing directions parallel to the direction of movement of the material, cutting means mounted on the carriage for movement therewith in the direction of movement of the material and for movement relative to the carriage transversely to that direction, and means for synchronising the movement of the carriage with the movement of the material during a cutting operation.

An embodiment of cutting apparatus in accordance with the invention, will now be described, by way of example only, with reference to the accompanying drawings, in which:

FIGURE 1 is a side elevation of an ingot supporting carriage, a burner and associated structure, and
FIGURE 2 is a plan view of the apparatus of FIGURE 1, and
FIGURES 3 to 8 illustrate diagrammatically the operation of the apparatus of FIGURES 1 and 2.

In FIGURES 1 and 2 the ingot carriage shown is in two parts, 11 and 15, and each part is made up of side frames 13 and lateral members 13A. The first part 11 is supported on wheels 12 running on rails 14, and the second part 15 is supported on wheels 16 also running on rails 14.

The part 11 carries seven rollers 17, rotatably supported in bearings 18 and driven by motors 19, via freewheel mechanism 20, neither of which are shown in FIGURE 1. The part 11 also carries an undriven roller 21 rotatably supported in bearings, and located beneath a pneumatically operated ingot clamping arrangement, mounted in a frame 22 and including a water-cooled jaw 23.

The part 15 of the carriage is provided with two motor-driven rollers 24, having motors 19 and free-wheel mechanisms 20 similar to those of the rollers 17.

A burner carriage 25, running on rails 26 parallel to and alongside the rails 14, is secured to the part 11 of the ingot carriage by a frame 27. The burner carriage 25 carries two arms 28, one above the other, on each of which a burner arm 29A and 29B is supported by two cranks 30, only three of which are shown, in FIGURE 2. The burner arms 29 are connected to two burners 31 having guards 32, and the cranks 30 are pivotable in order to raise or lower the burners 31. The burners 31 can be traversed laterally of the ingot carriage by racks and pinions (not shown) driving the arms 28 in slides on the burner carriage 25.

The two parts 11 and 15 of the carriage are secured together by a latch 32. The part 15 of the carriage is provided with a box 33 located below the burners 31 and extending across the width of the carriage, and the box catches the waste products of the cutting operation. A crop-end cradle 34 is also provided in the part 15, and this catches the crop-end cut from the ingot at the beginning and end of each continuous casting operation.

A pneumatic cylinder 35 is pivotally secured at 36 to a foundation, and the ram 37 is pivotally secured to a bracket 38 attached to one of the lateral members 13A of the carriage part 11.

Ingot levellers 39, forming a first ingot conveying means, and a main roller table 40, forming a second ingot conveying means, are provided at the limits of the travel of the carriage.

An auxiliary supporting unit 42 is provided to support part of the ingot between the end of the levellers 39 and the upstream most roller 24 of the carriage, as the carriage moves downstream to increase this gap. This supporting unit is raised to an operative position in which it supports the ingot by contact with the carriage moving downstream over it and is depressed to an inoperative position by return movement of the carriage.

The auxiliary supporting unit 42 is formed by two side frames 43 pivotally mounted on the floor between the rails 14, for rotation about a horizontal axis 44. An idler roller 45 is rotatably mounted between the frames 43 and projecting from each of the side frames is a small cam roller 46. In the inoperative position of the unit, as illustrated, the centre of gravity of the unit is to the left of the axis 44. When the carriage moves downstream the cam rollers 46 are contacted by projections 47, thus lifting the unit until its centre of gravity lies above the axis 44. Further movement of the carriage will cause the unit to overbalance and fall until the side frames are supported by the stop 48. The stop 48 is designed such that in this operative position the projections 47 now clear the cam rollers 46 and the unit is held in this position by virtue of its own weight and is capable of resisting a vertically downward thrust. The roller 45 is now at a level just below the level of the rollers 24 of the carriage and serves to support the part of the ingot extending between the carriage and the levellers 39.

The auxiliary unit 42 will remain in its operative position until such time as the carriage returns, when, after the projections 47 have passed over the cam rollers 46, the first carriage roller 24 will contact the roller 45 and push the unit back over centre to its depressed, inoperative position.

In operation, the ingot 41 (FIGURES 3 to 8) issues from the levellers 39 on to the rollers 24 and 17 of the ingot carriage, which is stationary and located adjacent the levellers as shown in FIGURE 3.

Shortly before the point at which the ingot is to be cut arrives beneath the burners 31 (FIGURE 4) the ingot carriage is accelerated by the pneumatic cylinder 35 and ram 37 until the speed of the carriage is synchronised with that of the ingot, at which time, the ingot will be stationary relative to the carriage.

Figure 5:
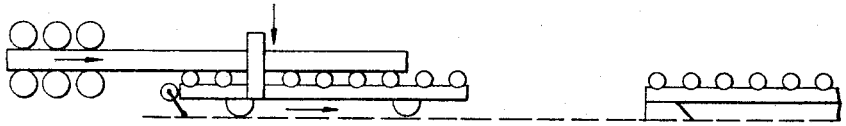

The pneumatic ingot clamping arrangement is then operated to clamp the ingot between the jaw 23 and the roller 21, and the burners 31 are each operated and traversed towards the centre of the ingot. This position is shown in FIGURE 5.

The clamp can be operated either by the operator's judgment or by an infinitely adjustable limit switch actuated by the slab, the limit switch being preset by the operator.

When the burners meet at approximately the centre of the ingot, one burner is returned to its outermost position as shown in FIGURE 2, and the other burner continues travelling across the ingot to complete the cut. This position is shown in FIGURE 6.

Figure 7:
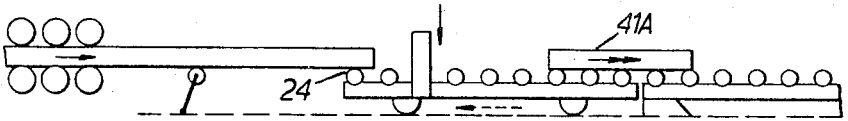
Figure 8:
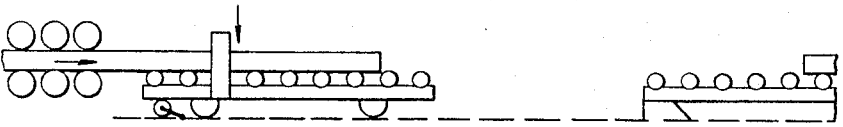

At this point, the ingot clamp is released, the rollers 17 are driven and the carriage is further accelerated to bring it to the position adjacent roller table 40, shown in FIGURE 7. The rollers of the main roller table 40 are then operated to convey the cut ingot 41A from the carriage, and the carriage is returned to its original position adjacent levellers 39 by the ram 37 or to a position in which the burners 31 are above the point on the ingot where the next cut is to be made; as shown in FIGURE 8.

The dimension X in FIGURE 3, which represents the maximum available stroke of the ingot carriage, is at least as long as the maximum length of the ingot that can be cast during the maximum time taken to cut the ingot. During normal operation the full stroke X will not be needed since the cutting operation proceeds comparatively quickly under normal conditions. The full stroke may be needed, however, at the beginning of the casting of the ingot, since the front end is chilled.

Figure 6:
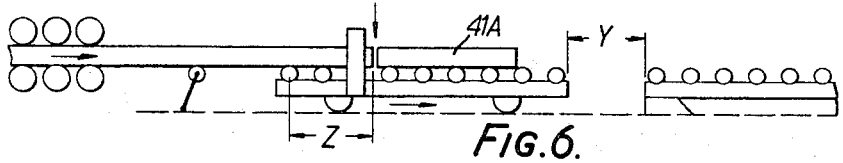

The dimensions of the carriage and its travel and the operation of the apparatus, is also such that at the moment the cut is completed, the dimension Y in FIGURE 6, which represents the remaining travel of the carriage, is less than the dimension Z which represents the distance between the axis of the upstream roller 24 of the carriage and the burners. This will allow the ingot carriage to be traversed to the main roller table 40 and the cut ingot 41A to be transferred thereto, immediately the cut is completed, whilst at least the upstreammost roller 24 is still supporting the ingot 41.

The arrangement of the ingot carriage in two parts 11 and 15 allows the two parts to be separated, thus facilitating removal of the crop-ends from the cradle 34, and emptying of the box 33.

We claim:

1. A method of cutting horizontally moving material which comprises supporting the material at intervals along its length and on each side of the portion to be cut on a moveable carriage, moving the carriage and cutting means with the same velocity as the moving material during a cutting operation, and additionally moving the cutting means transversely to the direction of movement of the material to effect a cut, and after the cut driving the cut off portion off the carriage and reversing the carriage through at least the distance travelled during the cutting operation.

2. A method of cutting horizontally moving elongate material, which comprises positioning a carriage adjacent a first material conveying means so as to receive and support at intervals along its length material issuing therefrom, and when the point of the material to be cut is adjacent burners moveable with the carriage accelerating the carriage and burners to the velocity of the material, clamping the carriage to the material, traversing the burners in the direction normal to the direction of travel of the material to effect a cut, releasing the clamping means, moving the carriage adjacent a second material conveyor means downstream of first material conveyor means, driving the material over the carriage onto the second material conveyor means, and reversing the carriage towards the first material conveyor means.

3. Apparatus for cutting horizontally moving material, comprising a carriage having support means thereon for supporting the material at intervals along its length on each side of the portion to be cut, means for moving the carriage in opposing directions parallel to the direction of movement of the material, cutting means mounted on the carriage for movement therewith in the direction of movement of the material and for movement relative to the carriage transversely to that direction, means for synchronizing the movement of the carriage with the movement of the material during a cutting operation, and drive means on the carriage for driving the material which has been cut off over the carriage.

4. Apparatus according to claim 3 in which the carriage is movable between a position in which the upstream end of the carriage is adjacent a first material conveyor means and a position in which the downstream end of the carriage is adjacent a second material conveyor means.

5. Apparatus according to claim 4 in which the carriage is moveable between these positions by means of a fluid operated piston and cylinder assembly.

6. Apparatus according to claim 4 in which the support means includes a plurality of rollers for supporting material at the level of the first and second material conveyor means, and the drive means including means for driving the rollers through free wheel mechanisms.

7. Apparatus according to claim 3 in which the means for synchronising the movement of the carriage with the movement of the material include means for clamping the carriage to the material.

8. Apparatus according to claim 3 in which the carriage is formed in two parts and including means beneath the cutting means for receiving waste products produced by the cutting operation.

9. Apparatus according to claim 4 in which the carriage is mounted on wheels and is moveable on rails extending between the first and second material conveying means, and in which a burner carriage is mounted on wheels moveable on a parallel set of rails located beside the carriage rails.

10. Apparatus according to claim 9 in which the cutting means comprises burners mounted on the burner carriage, and including means for moving the burners in a direction transverse to the rails.

11. Apparatus according to claim 4 including means arranged downstream of the first material conveying means in the path of the carraige, for supporting material between the first material conveying means and the upstream end of the carriage, as the carriage is moved downstream.

12. Apparatus according to claim 11 in which the means for supporting the material comprises a roller adapted to be moved to an operative material supporting position by movement of the carriage thereover in a downstream direction and to be moved to an inoperative position by return movement of the carriage.

References Cited

UNITED STATES PATENTS 2,262,619   11/1941   Morris _____ 83—319

HYLAND BIZOT, *Primary Examiner.*

DAVID L. RECK, *Examiner.*

W. W. STALLARD, *Assistant Examiner.*